Oct. 11, 1932.   R. J. BRITTAIN, JR., ET AL   1,882,478
JOURNAL BOX
Filed Nov. 5, 1930   2 Sheets-Sheet 1

INVENTORS
RICHARD J. BRITTAIN, JR.
OTTO W. YOUNG.
BY
Gales P. Moore
THEIR ATTORNEY.

Oct. 11, 1932.  R. J. BRITTAIN, JR., ET AL  1,882,478
JOURNAL BOX
Filed Nov. 5, 1930  2 Sheets-Sheet 2

INVENTORS.
RICHARD J. BRITTAIN, JR.
OTTO W. YOUNG.
BY Gales P. Moore
THEIR ATTORNEY.

Patented Oct. 11, 1932

1,882,478

UNITED STATES PATENT OFFICE

RICHARD J. BRITTAIN, JR., OF BLOOMFIELD, AND OTTO W. YOUNG, OF EAST ORANGE, NEW JERSEY, ASSIGNORS TO GENERAL MOTORS CORPORATION, OF DETROIT, MICHIGAN, A CORPORATION OF DELAWARE

JOURNAL BOX

Application filed November 5, 1930. Serial No. 493,457.

This invention relates to journal boxes and comprises all the features of novelty herein disclosed. An object of the invention is to provide a simple, inexpensive, and thoroughly practical journal box having a journalled shaft and thrust construction therefor. Another object is to provide a journal box with improved means for assembling and retaining thrust device and guiding a bearing. Another object is to provide an improved retaining ring for a thrust block.

To these ends and to improve generally and in detail upon devices of this character, the invention also consists in the various matters hereinafter described and claimed. In its broader aspects, the invention is not necessarily limited to the specific construction selected for illustrative purposes in the accompanying drawings in which Fig. 1 is a sectional view on line 1—1 of Fig. 2.

Figure 1:
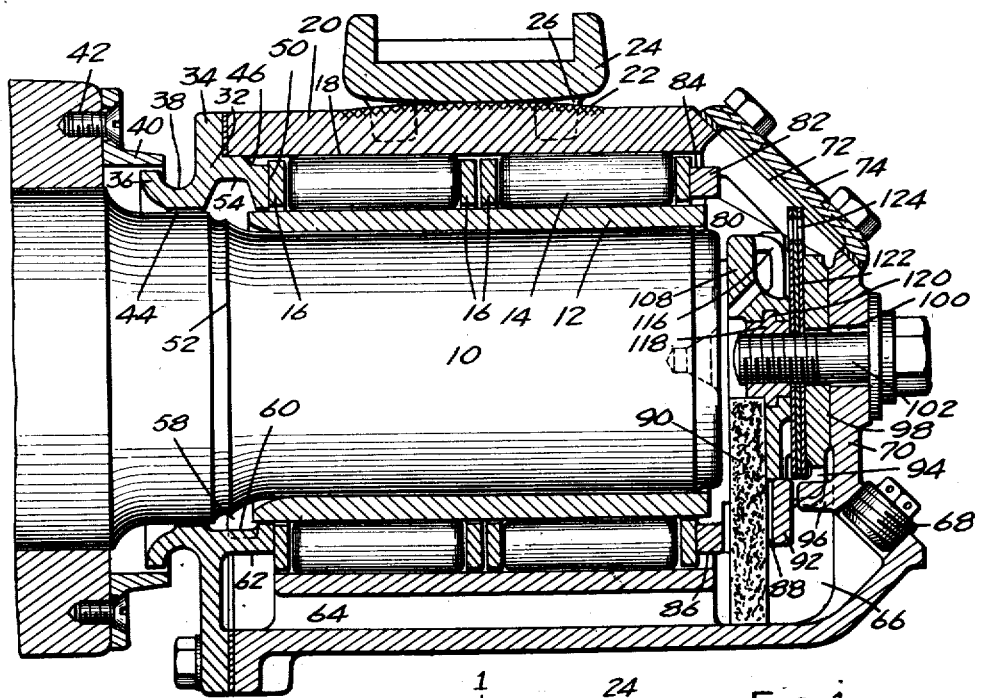
Figure 2:
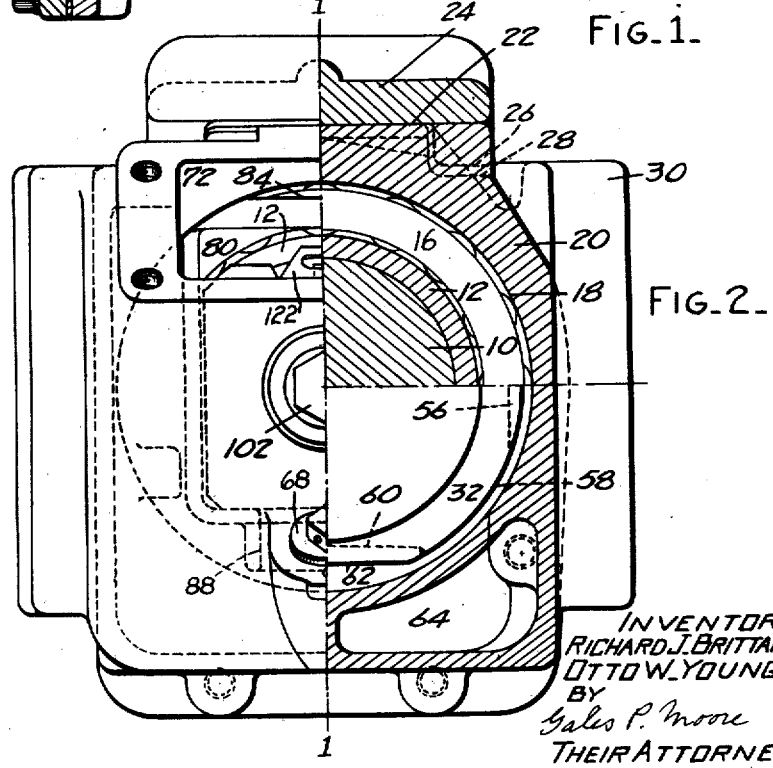
Fig. 2 is an end view with one quarter a central cross section and with one quarter a cross section at the inner end of the bearing.
Figures 3, 4:
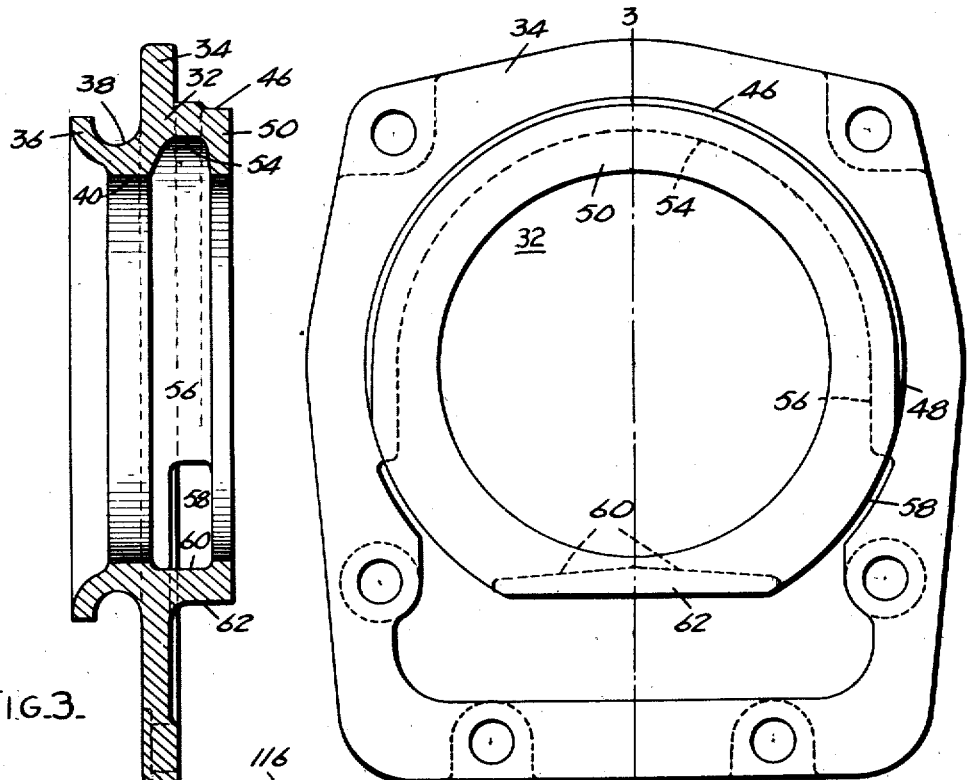
Fig. 3 is a cross sectional view on line 3—3 of Fig. 4.
Fig. 4 is a side view of the end ring or cap.
Figure 9:
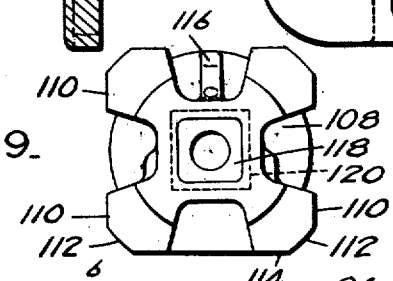
Fig. 9 is an outer side view of the thrust block.
Figure 8:
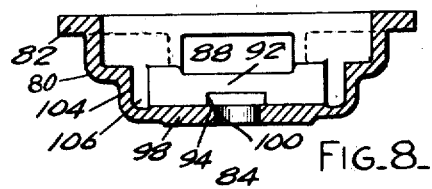
Fig. 8 is a cross sectional view on line 8—8 of Fig. 7.
Figure 5:
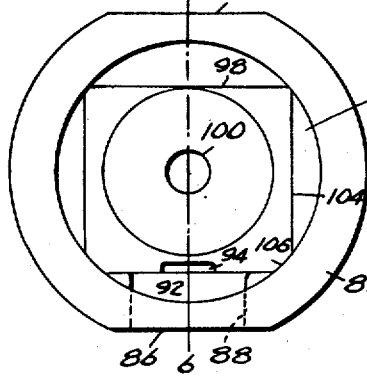
Fig. 5 is an inner side view of the retaining member.
Figure 6:
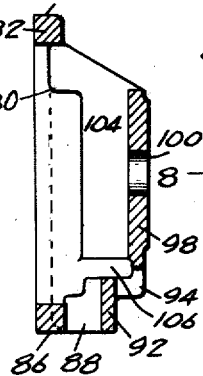
Fig. 6 is a cross sectional view on line 6—6 of Fig. 5.
Figure 7:
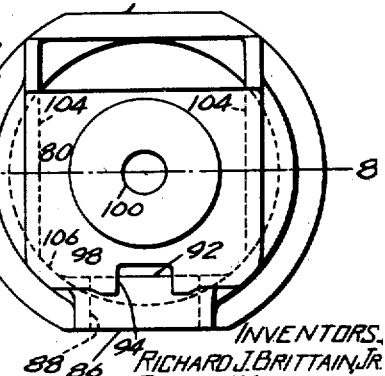
Fig. 7 is an outer side view of the retaining member.

A shaft or axle 10 carries a sleeve 12 on which run a pair of aligned roller bearings 14 having cage rings 16, the rollers also running directly in the hardened bore 18 of an axle box 20. The top of the box is crowned at 22 to rockably support a plate 24 to which the load is transmitted in any suitable way, the plate having retaining lugs 26 entering recesses 28 in the box. The opposite sides of the box are provided with the usual pedestal guide flanges 30.

At the inner end, the box is closed by a sealing plate 32 having a flange 34 bolted to the box with a gasket interposed. The closure plate has a curved extension 36 forming a peripheral groove 38 surrounded by a slinger flange 40 on an angled ring which is fastened to a wheel hub by screws 42. The extension 36 has a portion 44 bored to closely embrace the axle. The sealing plate also has an axial extension entering the bore of the box and provided with an arcuate relief groove 46 which extends around the upper half and terminates at short flattened surfaces 48. Thus excess lubricant, propelled by the rollers axially, will run around in the groove and drop back into the inner end of the box. The plate 32 has a flat face 50 on its axial extension to guide the adjacent cage ring 16 and limit axial movement of the rollers in one direction.

The axle has a slinger rib 52 and the extended inner end of the sleeve 12 forms an additional slinger to arrest lubricant and throw it outwardly into an internal groove 54 of the sealing plate, the groove extending around the upper half of the axle and terminating at vertical flat faces 56 which form the upper edges of a pair of openings 58. The lower edges of these openings are formed by the terminal edges of oppositely inclined drain walls 60 which diverge downwardly in opposite directions from a point directly under the axle. Thus, lubricant thrown from the upper side of the axle is drained by the groove 54 to drop through the opening and the lubricant thrown from the lower point of the axle is delivered substantially tangentially down the inclines to the openings. The inclines are formed on a partition 62 which acts as a barrier to splashing or surging of lubricant upwardly to the axle from the cored out passages 64 at the bottom of the box. These passages connect the inner end of the box with a lubricant reservoir 66 filled at the plug 68 in the integral outer end wall 70 of the box. At the top and outer end, the box has an inclined opening 72 of substantially rectangular outline closed by a detachable lid 74. A thrust block and spacing plates can be inserted and removed through the opening, these being detachably held in a retaining member as will appear.

The retaining member comprises a body portion 80 having a flange 82 guiding the adjacent bearing ring 16, the flange fitting in the bore of the box except at the top and bottom where it is thickened and provided with flat walls 84 and 86 respectively. The flattened walls provide openings affording passage for lubricant and the upper opening also facilitates visual inspection of the bearings when the lid 74 is removed. The retaining member has a vertical opening 88 at the bottom for a lubricating wick 90 which is intermittently engaged by the end of the axle to receive lubricant. A cross web 92 forms one wall of the wick opening and outside of it is a notch 94 engaged by a lug 96 projecting inwardly from the rear wall 70 of the box, thus holding the retaining member from rotation. The retaining member has an outer wall 98 resting against the end wall of the box and provided with a central opening 100 for free passage of a clamping screw 102 which detachably holds a thrust block and spacing plates as will appear. The retaining member has an internal recess open at the top over the transverse wall 98 and bounded laterally by straight side walls 104 and short curved walls 106 above the cross web 92 which forms a bottom wall or shelf. In the recess is carried a thrust block 108 for the axle, the block being generally arcuate adjacent to the axle but having its outermost portion provided with straight, though interrupted, side walls 110 connected by arcuate walls 112 to a straight bottom wall 114. The walls 110 and 114, respectively, engage the walls 104 and web 92 of the retainment member and relative rotation of the block and retainment member is thus prevented. The recess is open upwardly towards the box opening and is in alignment with the later to form a passage for the thrust block transversely of the axle. The thrust block has a handle 116 at the top so it can be lifted out of the recess in the retainment member and through the opening 72 in the box when the screw bolt 102 is withdrawn from a nut 118 in the thrust block. The nut 118 is externally square and has a square flange 120, and the thrust block, which is preferably of bronze, is cast around it. Spacing plates 122 having hand holes 124 are carried in the recess of the retaining member between the thrust block and the wall 98 and are also removable through the box opening. The spacing plates adjust the initial clearance between the end of the axle and the thrust block. Thus, the screw bolt 102, when secured by a lock washer, clamps the thrust block against the spacing plates, clamps the spacing plates against the wall 98, and clamps the wall 98 against the member 70. The abutting relation of these members opposite to the axle gives a firm backing to transmit thrust forces from the axle to the box.

We claim:

1. In a device of the character described, a housing, a shaft extending into the housing, the housing having an end wall spaced from the end of the shaft and provided with an opening, a thrust block opposing the end of the shaft, a retaining member in the housing and having a recess for the thrust block, and the recess being open towards and in alignment with the opening in the end wall to form a transverse passage for removal of the thrust block from the retaining member and the housing; substantially as described.

2. In a device of the character described, a housing, a shaft extending into the housing, the housing having an end wall spaced from the end of the shaft and provided with an opening, a thrust block opposing the end of the shaft, a retaining member in the housing and having a recess for the thrust block, the recess being open towards and in alignment with the opening in the end wall for removal of the thrust block from the retaining member and the housing, and means for securing the thrust block and retaining member in abutting relation to the end wall; substantially as described.

3. In a device of the character described, a housing, a shaft extending into the housing, the housing having an end wall spaced from the end of the shaft and provided with an opening, a thrust block opposing the end a housing, a shaft extending into the housing and having a recess for the thrust block, spacing plates in the recess between the thrust block and the retaining member, the recess in the retaining member being open towards and aligned with the opening in the end wall for removal of the thrust block and spacing plates, and means for clamping the thrust block, spacing plates and retaining member in abutting relation to the end wall of the housing; substantially as described.

4. In a device of the character described, a housing, a shaft extending into the housing, the housing having an end wall spaced from the end of the shaft, a thrust block opposing the end of the shaft, a retaining member in the housing and having a transverse wall extending between the end wall and the thrust block, and a clamping screw for securing the thrust block and the retaining member in abutting relation to the end wall of the housing; substantially as described.

5. In a device of the character described, a housing, a shaft extending into the housing, the housing having an end wall spaced from the end of the shaft, a thrust block opposing the end of the shaft, a retaining member in the housing and having a wall extending between the end wall and the thrust block, spacing plates between the thrust block and said wall of the retaining member, and means for clamping the thrust block, spacing plates and retaining member in abutting relation to the end wall of the housing; substantially as described.

6. In a device of the character described, a housing, a shaft extending into the housing, the housing having an end wall spaced from the end of the shaft and provided with an opening, a thrust block opposing the end of the shaft and removable through the opening, a retaining member in the housing and having a recess for the thrust block, and means for removably securing the thrust block in the recess of the retaining member and comprising a fastener passing through the end wall and the retaining member and removably engaging the thrust block; substantially as described.

7. In a device of the character described, a housing, a shaft extending into the housing, the housing having an end wall spaced from the end of the shaft and provided with an opening, a thrust block opposing the end of the shaft and removable through the opening, a retaining member in the housing and having a recess for the thrust block, the recess in the retaining member being aligned with the housing opening for removal of the thrust block from the retaining member and the housing, removable means for securing the thrust block to the retaining member, and the retaining member having a shelf for supporting the thrust block when the securing means is removed; substantially as described.

8. In a device of the character described, a housing, a shaft extending into the housing, the housing having an end wall spaced from the end of the shaft and provided with an opening, a thrust block opposing the end of the shaft and removable through the opening, a retaining member in the housing and having a recess for the thrust block, and the retaining member and the end wall having an interfitting lug and notch for holding the recess in alignment with the opening in the end wall; substantially as described.

9. In a device of the character described, a housing, a shaft extending into the housing, the housing having an end wall provided with an abutment face, a retaining member in the housing and provided with an outer wall engaging the abutment face, and a thrust block opposing the end of the shaft and carried in the retaining member at the inner side of said outer wall, said outer wall extending between the thrust block and said abutment face; substantially as described.

10. In a device of the character described, a housing, a shaft extending into the housing, the housing having an end wall provided with an abutment face, a retaining member in the housing and provided with an outer wall engaging the abutment face, the retaining member having a recess, spacing plates in the recess in abutting relation to the outer wall of the retaining member, and a thrust block in the recess and engaging said spacing plates; substantially as described.

11. In a device of the character described, a housing, a shaft extending into the housing, the housing having an end wall provided with an abutment face, a retaining member in the housing and provided with an outer wall engaging the abutment face, thrust means carried in the retaining member and engaging said outer wall of the retaining member, and said outer wall and said end wall having an interfitting lug and notch; substantially as described.

12. In a device of the character described, a housing, a shaft extending into the housing, the housing having an end wall provided with an abutment face, a retaining member in the housing and provided with an outer wall engaging the abutment face, the retaining member having a laterally open recess, and thrust means removably carried in said recess at the inner side of said outer wall; substantially as described.

13. In a device of the character described, a housing, a shaft extending into the housing, the housing having an end wall provided with an abutment face, a retaining member in the housing and provided with an outer wall engaging the abutment face, the retaining member having a recess opening above said outer wall and a shelf at the bottom of the recess, and thrust means removably carried in said recess and arranged to engage the shelf; substantially as described.

14. In a device of the character described, a housing, a shaft extending into the housing, the housing having an end wall provided with an abutment face, a retaining member in the housing and provided with an outer wall engaging the abutment face, the retaining member having a recess, a thrust block in the recess, the outer wall of the retaining member having an opening, and fastening means passing through the opening and removably engaging the thrust block; substantially as described.

15. In a device of the character described, a housing, a shaft extending into the housing, the housing having an end wall provided with an abutment face, a retaining member in the housing and provided with an outer wall engaging the abutment face, the retaining member having a recess and a shelf at the bottom of the recess, a thrust block in the recess and arranged to engage the shelf, and fastening means passing through the outer wall and removably engaging the thrust block; substantially as described.

16. In a device of the character described, a housing, a shaft extending into the housing, a bearing between the shaft and the housing, the housing having an end wall provided with an abutment face, a retaining ring fitting in the housing and provided with a flat outer wall engaging the abutment face, the ring having a guide flange for the bearing and a recess opening above said outer wall, and a thrust block removably carried in said recess; substantially as described.

17. In a device of the character described, a housing, a shaft extending into the housing, a bearing between the shaft and the housing, the housing having an end wall provided with an opening at the top, a retaining ring fitting in the housing and having a guide flange for the bearing and another portion abutting against said end wall, and the guide flange of the ring having an opening aligned with the opening in the end wall and exposing the end of the bearing; substantially as described.

18. In a device of the character described, a housing, a shaft extending into the housing, a bearing between the shaft and the housing, the housing having an end wall, a retaining ring fitting in the housing and having a guide flange for the bearing and another portion abutting against said end wall, and the guide flange of the ring having its periphery flattened above and below the shaft to afford communication between the bearings and the outer end of the housing; substantially as described.

In testimony whereof we hereunto affix our signatures.

RICHARD J. BRITTAIN, Jr.
OTTO W. YOUNG.

CERTIFICATE OF CORRECTION.

Patent No. 1,882,478.　　　　　　　　　　October 11, 1932.

RICHARD J. BRITTAIN, JR., ET AL.

It is hereby certified that error appears in the printed specification of the above numbered patent requiring correction as follows: Page 2, lines 102, claim 3, strike out the words "a housing, a shaft extending into" and insert instead of the shaft, a retaining member in; and that the said Letters Patent should be read with this correction therein that the same may conform to the record of the case in the Patent Office.

Signed and sealed this 29th day of November, A. D. 1932.

M. J. Moore,
Acting Commissioner of Patents.

(Seal)

the housing having an end wall provided with an abutment face, a retaining ring fitting in the housing and provided with a flat outer wall engaging the abutment face, the ring having a guide flange for the bearing and a recess opening above said outer wall, and a thrust block removably carried in said recess; substantially as described.

17. In a device of the character described, a housing, a shaft extending into the housing, a bearing between the shaft and the housing, the housing having an end wall provided with an opening at the top, a retaining ring fitting in the housing and having a guide flange for the bearing and another portion abutting against said end wall, and the guide flange of the ring having an opening aligned with the opening in the end wall and exposing the end of the bearing; substantially as described.

18. In a device of the character described, a housing, a shaft extending into the housing, a bearing between the shaft and the housing, the housing having an end wall, a retaining ring fitting in the housing and having a guide flange for the bearing and another portion abutting against said end wall, and the guide flange of the ring having its periphery flattened above and below the shaft to afford communication between the bearings and the outer end of the housing; substantially as described.

In testimony whereof we hereunto affix our signatures.

RICHARD J. BRITTAIN, JR.
OTTO W. YOUNG.

CERTIFICATE OF CORRECTION.

Patent No. 1,882,478.　　　　　　　　　　　　　October 11, 1932.

RICHARD J. BRITTAIN, JR., ET AL.

It is hereby certified that error appears in the printed specification of the above numbered patent requiring correction as follows: Page 2, lines 102, claim 3, strike out the words "a housing, a shaft extending into" and insert instead of the shaft, a retaining member in; and that the said Letters Patent should be read with this correction therein that the same may conform to the record of the case in the Patent Office.

Signed and sealed this 29th day of November, A. D. 1932.

M. J. Moore,
Acting Commissioner of Patents.

(Seal)

CERTIFICATE OF CORRECTION.

Patent No. 1,882,478.                                                  October 11, 1932.

RICHARD J. BRITTAIN, JR., ET AL.

It is hereby certified that error appears in the printed specification of the above numbered patent requiring correction as follows: Page 2, lines 102, claim 3, strike out the words "a housing, a shaft extending into" and insert instead of the shaft, a retaining member in; and that the said Letters Patent should be read with this correction therein that the same may conform to the record of the case in the Patent Office.

Signed and sealed this 29th day of November, A. D. 1932.

(Seal)                                              M. J. Moore,
                                                         Acting Commissioner of Patents.